(12) United States Patent
Bergström

(10) Patent No.: US 8,360,194 B2
(45) Date of Patent: Jan. 29, 2013

(54) TRANSFER BOX FOR TRANSFERRING GEARSHIFTING MOVEMENTS IN A VEHICLE

(75) Inventor: Klas Bergström, Västra Frölunda (SE)

(73) Assignee: Volvo Lastvagner AB, Göteborg (SE)

( * ) Notice: Subject to any disclaimer, the term of this patent is extended or adjusted under 35 U.S.C. 154(b) by 637 days.

(21) Appl. No.: 12/522,920

(22) PCT Filed: Jan. 12, 2007

(86) PCT No.: PCT/SE2007/000019
§ 371 (c)(1),
(2), (4) Date: Feb. 18, 2010

(87) PCT Pub. No.: WO2008/085089
PCT Pub. Date: Jul. 17, 2008

(65) Prior Publication Data
US 2010/0147096 A1    Jun. 17, 2010

(51) Int. Cl.
*B62D 33/067* (2006.01)
*B60K 20/00* (2006.01)

(52) U.S. Cl. .............. 180/327; 180/328; 180/89.13; 180/89.14; 74/473.3

(58) Field of Classification Search .............. 180/327, 180/328, 89.13, 89.14, 315; 74/473.3
See application file for complete search history.

(56) References Cited

U.S. PATENT DOCUMENTS

| 4,206,826 A | * | 6/1980 | McMillen et al. | ............ 180/328 |
| 4,235,299 A | * | 11/1980 | Reynolds | ............ 180/328 |
| 4,269,282 A | | 5/1981 | Meacock, II et al. | |

FOREIGN PATENT DOCUMENTS

| DE | 2527407 A1 | 1/1977 |
| EP | 342174 A1 | 11/1989 |
| EP | 0999084 A2 | 5/2000 |
| FR | 2167825 A5 | 8/1973 |
| FR | 2184218 A5 | 12/1973 |
| FR | 2254197 A5 | 7/1975 |
| GB | 1536395 A | 12/1978 |
| WO | 8200809 A1 | 3/1982 |

OTHER PUBLICATIONS

Supplementary European Search Report for corresponding EP 07 70 1105.
International Search Report for corresponding International Application PCT/SE2007/000019.

* cited by examiner

*Primary Examiner* — Joseph Rocca
*Assistant Examiner* — Joselynn Y Sliteris
(74) *Attorney, Agent, or Firm* — WRB-IP LLP

(57) ABSTRACT

A transfer box for transferring movements and forces from a gearshift lever of a tiltable vehicle cab portion to a gearbox includes a first frame portion mounted on the cab portion, the first frame portion including at least one first journalled lever portion and being connectable to cable ends or push rods connected to the gear shift lever, a second frame portion mounted on a vehicle chassis, the second frame portion including at least one journalled second lever portion and being connected to the gearbox via cable ends or pushrods, wherein the first lever portions and the second lever portions interact to enable movement/force transfer from the cable ends/push rods connected to the first lever portions to the cable ends/push rods connected to the second lever portions. The at least one first and the at least one second lever portions are provided with wedge shaped cooperating portions.

8 Claims, 3 Drawing Sheets

TRANSFER BOX FOR TRANSFERRING GEARSHIFTING MOVEMENTS IN A VEHICLE

BACKGROUND AND SUMMARY

The present invention relates to a transfer box for transferring movements and forces from a tiltable cab portion of a heavy vehicle to a gearbox, mounted in its chassis. The transfer box comprises a first frame portion mounted on the cab portion, and comprises at least one lever portion journalled on at least one bearing. The lever portion is connected to cable ends or push rods connected to a gear shift lever. A second frame portion is mounted on the vehicle chassis and comprises at least one second lever portion journalled on at least one bearing and connected to cable ends or pushrods connected to a gearbox. The first lever portions and the second lever portions interact to enable transfer of movements and force from the cable ends or push rods connected to the first lever portions to the cable ends or push rods connected to the second lever portions.

For heavy duty vehicles, where the maximum length of road-going vehicles is restricted, it is common to provide the vehicle with a cab mounted on top of the engine compartment, i.e. a so called cab-over or COE (Cab Over Engine) design. On such vehicles, it is more or less a standard design to provide the entire cab with a tilting function, in order to give access to the engine compartment. The tilting function does pose complications, mainly when it comes to transfer of driver commands to the components mounted in the chassis, such as steering wheel movements to the steering wheels, clutch pedal commands to the clutch, brake pedal movements to the brakes, and gearshift lever movements to the gearbox. This invention is mainly directed towards a transfer box enabling low friction transfer of gearshift lever movements to the gearbox.

One other feature of COE designs is that the cab in most cases is resiliently suspended from the chassis, in order not to transfer chassis vibrations to the cab, it is advantageous if all connections between the cab and the chassis are resiliently suspended from the chassis.

Today, there are mainly two different systems in use for transferring gear shift movements, namely pushrod systems, wherein inflexible pushrods are used to transfer the movements from the gearshift lever to the gearbox, and cable based systems, wherein a flexible cable capable of transferring both pulling and pushing force is housed within a flexible conduit capable of withstanding both pulling and pushing forces.

The main drawbacks with the pushrod systems are, firstly, that vibrations from the gearbox and chassis are transmitted to the gearshift lever, and secondly, that adjustments of the gearshift lever position vs. the actual gear position are difficult. Moreover, it might be necessary to dismount the pushrods prior to a cab tilting operation or to use a design where the pushrods system is separable, such as described in EP 34 21 74.

As could be understood, cable systems are much more flexible than pushrod systems; hence, less vibrations are transferred to the gearshift lever, and it is also possible to tilt the cab without interrupting the connection between the gear shift lever and the gearbox, which, as mentioned earlier, could be necessary for pushrod systems. There is however one severe drawback connected to cable systems, namely "internal" friction, i.e. friction between the cable and the conduit surrounding the cable. This problem becomes aggravated if the cable and conduit assembly is bent in curves, which more or less is mandatory in order to obtain enough flexibility to allow cab tilting. In order to allow for tilting of the cab, the cable must go around the tilting centre of the cab, which in a standard design implicates a direction change for the cable of about 180 degrees.

The internal friction is a detrimental for the force required for shifting gear, the λλfeel" of shifting gear and, lastly, the speed to shift gear.

According to an aspect of the present invention, a transfer box comprises first and second cooperating lever portions, wherein the first and the second lever portions are provided with cooperating portions comprising a wedge provided on the at least one first lever, and a wedge shaped opening provided on the at least one second lever.

In a preferred embodiment of the invention, the second frame portion is suspended from the chassis by at least one resilient member, e.g. a spring.

In order to enable proper alignment and transfer of reaction forces between the first and second lever portions, alignment means could be connected to first and second frame portions, respectively. In order to reduce friction of the transfer box, the lever portions could be journalled on ball bearings.

BRIEF DESCRIPTION OF THE DRAWINGS

In the following, the invention will be described with reference to the appended drawings, wherein.

DETAILED DESCRIPTION

Figure 1:
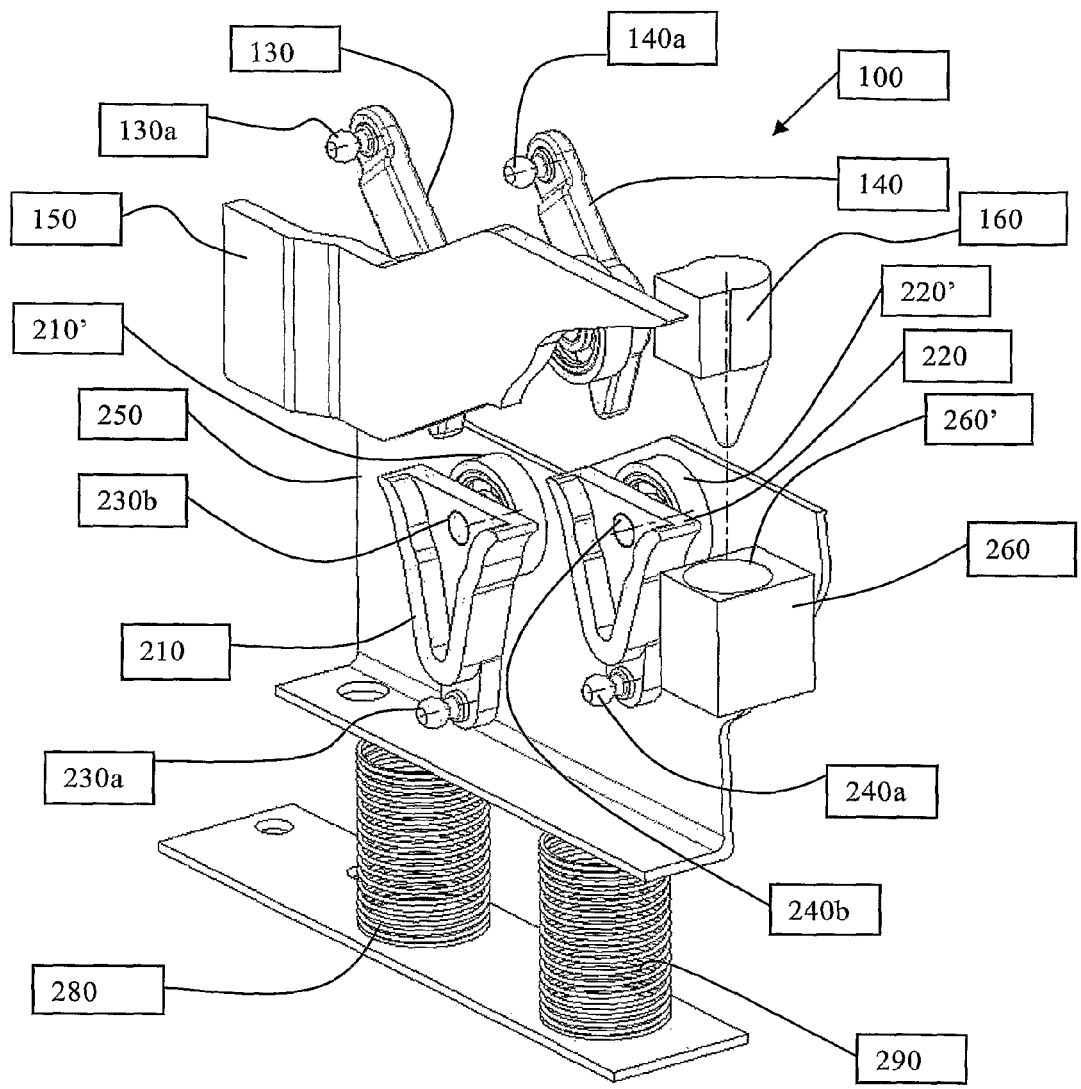
FIG. 1 is a perspective view showing two cooperating portions of a gear connection according to the present invention in a non connected state.

In FIG. 1, a dividable transfer box 100 is shown in an open position. The transfer box 100 comprises first and second upper lever portions 130, 140, which are connectable to first and second lower lever portions 210, 220, respectively, in a way that will be described below.

In an operating position, i.e. when a cab portion of a vehicle is in an untilted, i.e. driving, position, the first and second upper lever portions 130, 140 are connected to the first and second lower lever portions 210, 220, which in turn are connected to pushrods or cables (not shown). The pushrods or cables are connected to control levers (not shown) of a gearbox (not shown). Movements of the push rods or cables will effect gear changes of the gearbox, in a way well known to persons skilled in the art, thus transferring preferably two dimensional movements of the control lever to the gearbox.

Figure 2:
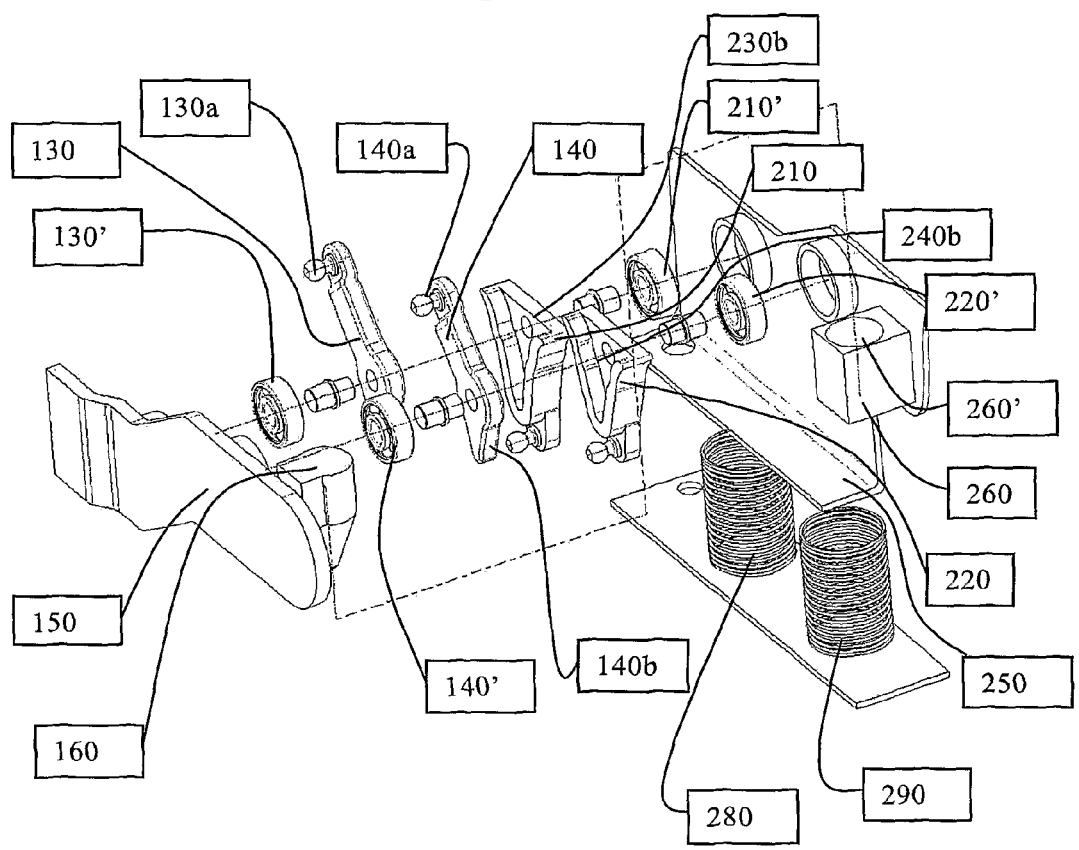
FIG. 2 is an exploded perspective showing components of the gear connection according to the present invention.

As shown in FIG. 2, the upper first and second lever portions 130, 140 are shown mounted in a first frame portion 150. The upper first and second lever portions 130, 140 are journalled in bearings 130', 140', which are fastened to the frame portion 150 and allows rotation of the upper first and second lever portions 130, 140. The upper first and second lever portions 130, 140 are provided with connection means 130a, 140a for connecting to first and second cable or pushrod ends (not shown). Moreover, opposite, compared to the connection means 130a, 140a, ends of the first and second upper lever portions 130, 140 are formed as connecting wedges 140b (the wedge of first lever portion 130 is hidden by bearing 140' in FIG. 2). A cone shaped member 160 of an alignment means could be included in the first frame portion 150.

Moreover, the first and second lower lever portions 210, 220 are shown. The first and second lower lever portions 210, 220 are journalled in bearings 210', 220', which in turn are fastened to a second frame portion 250. An alignment member 260, comprising a cone shaped opening 260', whose shape corresponds to the shape of the cone shaped member 160 of the first frame portion 150 could be fastened to the second frame portion 250. The frame portion is preferably fastened to a vehicle chassis by means of two resilient members 280, 290, such as coil springs. These springs accommodate movements between the chassis and the cab portion, which movements primarily emanates from the fact that most cab portions are suspended from the chassis, but may also emanate from manufacturing tolerances. The first and second lower lever portions 210, 220 are provided with means for connection, 230a, 240a to the push rods or cables (not shown). Moreover, they are each provided with wedge shaped openings 230b, 240b, whose shape corresponds to the shape of the connecting wedges 140b, respectively (the wedge of first lever portion 130 is hidden by bearing 140' in FIG. 2).

As mentioned earlier, the invention aims to solve the problem with transfer of gearshift movements from a gear lever mounted in a tiltable cab (not shown) of the vehicle and the gearbox, which usually is mounted within the vehicle chassis. To solve this problem, the second frame portion 250 is mounted on the vehicle chassis, as mentioned suspended by the springs 280, 290, and the first frame portion 150 is mounted on the tiltable cab such that the bearings 130', 210', 140' and 220' are aligned, i.e. such that the centre axes of the bearings 130' and 140' are aligned with the centre axes of the bearings 210', 220', respectively, whenever the cab portion is in an untilted position. If the distance between the frame portions is correct, which could be guaranteed by the provision of the cone shaped member 160 and the alignment member 260, comprising the cone shaped opening 260', the connecting wedges 140b (the wedge of first lever portion 130 is hidden by bearing 140' in FIG. 2) will engage the wedge shaped openings 230b, 240b of the first and second lower lever portions 210, 220. This engagement makes the first and second lower lever portions 210, 220 and the upper first and second lever portions 130, 140 move as two separate levers, wherein the first separate lever comprises the upper lever portion 130 and the lower lever portion 210, and wherein the second separate lever comprises the upper lever portion 140 and the lower lever portion 220.

As could be understood from the above description, there will be a transfer of movement and force through the separate levers; a force or movement exerted on either of the connection means 130a, 140a will, due to the rotatable mounting of the levers in the bearings 130', 210', 140' and 220' be transferred to the push rods or cables (not shown) connected at lower connection means 230a and 240a, meaning that a movement of the gear lever in the cab will be transferred to the gearbox, and effect a gear shift. When the cab is tilted, e.g. for service, the connecting wedges 140b (the wedge of first lever portion 130 is hidden by bearing 140' in FIG. 2) and the wedge shaped openings 230b, 240b will disengage from one another and hence enable the cab to be tilted. After the service has been performed, the cab is tilted back to its driving position. Here, the wedge shape of the connecting wedges and the wedge shaped openings of the lever portions is very beneficial; if the gear shift lever in the cab would move during the time the cab is tilted (which, by the way, is likely to happen), then the mutual position between the first and second lower lever portions 210, 220 and the upper first and second lever portions 130, 140, respectively, will change. Due to the wedge shape, such misalignment will however be adjusted automatically, since the tip of the connection wedges, if misaligned, will be guided by the walls of the wedge shaped openings until the connecting wedges 140b (the wedge of first lever portion 130 is hidden by bearing 140' in FIG. 2) are properly housed within the wedge shaped openings 230b, 240b. This will guarantee a proper adjustment of the gearshift lever vs. the gearbox, even after a tilting/untilting operation of the cab portion.

Figure 3:
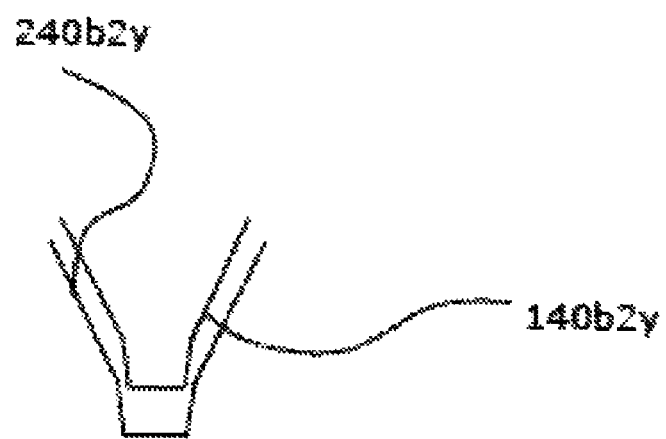
FIG. 3 schematically shows a wedge shaped opening and a corresponding wedge for upper and lower lever portions according to another embodiment of the present invention.

In a further embodiment of the invention shown in FIG. 3, a wedge shaped opening and a corresponding connecting wedge 240b2y and 140b2y, respectively, could be formed even more in a Y-shape instead of V-shape. A Y-shape would have the above mentioned benefits of the V-shape and additionally the benefit of a more secure connection.

The invention should not be deemed to be limited to the embodiments described above, but rather a number of further variants and modifications are conceivable within the scope of the following patent claims.

The invention claimed is:

1. A transfer box for transferring movements and forces from a gearshift lever of a tiltable cab portion of a heavy vehicle to a gearbox mounted in a chassis of the heavy vehicle, the transfer box comprising a first frame portion mounted on the cab portion, the first frame portion comprising at least one first lever portion journalled on at least one first bearing and being connectable to cable ends or push rods connected to the gear shift lever, a second frame portion mounted on the vehicle chassis, the second frame portion comprising at least one second lever portion journalled on at least one second bearing and being connectable to cable ends or pushrods connected to a gearbox, wherein the at least one first lever portion and the at least one second lever portion cooperate to form at least one lever enabling transfer of movements and force from the cable ends or push rods connectable to the at least one first lever portion to the cable ends or push rods connectable to the at least one second lever portion when the transfer box is in an operating position, wherein the at least one first and the at least one second lever portions are provided with cooperating portions comprising a wedge provided on the at least one first lever portion, and a wedge shaped opening provided on the at least one second lever portion, and a center axis of the at least one first bearing is aligned with a center axis of the at least one second bearing.

2. The transfer box according to claim 1, wherein the wedge and the corresponding wedge shaped opening are mainly shaped in a Y-form.

3. The transfer box according to claim 1, wherein the wedge and the corresponding wedge shaped opening are mainly shaped in a V-form.

4. The transfer box according to claim wherein the second frame portion is suspended from the chassis by at least one resilient member.

5. The transfer box according to claim 4, wherein the at least one resilient member is a spring.

6. The transfer box according to claim 1, further comprising cooperating alignment means connected to the first and second frame portions, respectively.

7. The transfer box according to claim 6, wherein the cooperating alignment means are mainly shaped in a cone form.

8. The transfer box according to claim 1, wherein the at least one first bearing of the first frame portion and the at least one second bearing of the second frame portion are ball, roller or needle bearings.

* * * * *

UNITED STATES PATENT AND TRADEMARK OFFICE
CERTIFICATE OF CORRECTION

PATENT NO. : 8,360,194 B2
APPLICATION NO. : 12/522920
DATED : January 29, 2013
INVENTOR(S) : Klas Bergstrom Page 1 of 1

It is certified that error appears in the above-identified patent and that said Letters Patent is hereby corrected as shown below:

Title Page, item (73); the assignee's name is incorrectly shown as "Volvo Lastvagner AB" and should be shown as --Volvo Lastvagnar AB--.

Signed and Sealed this
Fifth Day of March, 2013

Teresa Stanek Rea
*Acting Director of the United States Patent and Trademark Office*